United States Patent
Blankstein et al.

(10) Patent No.: US 10,637,666 B1
(45) Date of Patent: *Apr. 28, 2020

(54) MIGRATING DATA FOR DECENTRALIZED APPLICATIONS BETWEEN DISPARATE BACKEND STORAGE PROVIDERS

(71) Applicant: Blockstack PBC, New York, NY (US)

(72) Inventors: Aaron Blankstein, Chicago, IL (US); Jude Nelson, New Brunswick, NJ (US); Lawrence Salibra, Hong Kong (CN); Matthew Little, New York, NY (US)

(73) Assignee: Blockstack PBC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,632

(22) Filed: Aug. 29, 2019

(51) Int. Cl.
*H04L 9/32* (2006.01)
*G06F 3/06* (2006.01)

(52) U.S. Cl.
CPC ............ *H04L 9/3242* (2013.01); *G06F 3/067* (2013.01); *G06F 3/0622* (2013.01); *G06F 3/0647* (2013.01)

(58) Field of Classification Search
CPC ..... H04L 9/3242; G06F 3/0622; G06F 3/067; G06F 3/0647
See application file for complete search history.

(56) References Cited

U.S. PATENT DOCUMENTS

| 2015/0089623 | A1* | 3/2015 | Sondhi | H04L 63/08 726/9 |
| 2017/0236123 | A1 | 8/2017 | Ali et al. | |
| 2019/0278506 | A1* | 9/2019 | Richardson | H04L 67/1095 |

OTHER PUBLICATIONS

Ali, Muneeb, Dissertation, Trust-to-Trust Design of a New Internet, dated Jun. 2017.
Ali, Muneeb et al., Blockstack: A New Decentralized Internet, dated May 2017.
Ali, Muneeb et al., Blockstack: A New Internet for Decentralized Applications, dated Oct. 2017.
Ali, Muneeb et al., Blockstack: A Global Naming and Storage System Secured by Blockchains. In Proceedings of the 2016 USENIX Annual Technical Conference, Jun. 2016.
Ali, Muneeb et al., Bootstrapping Trust in Distributed Systems with Blockchains. In USENIX ;login 41(3):52-58, Fall 2016.
Ali, Muneeb et al., The Blockstack Decentralized Computing Network, dated May 30, 2019.
Nelson, Jude et al., Extending Existing Blockchains with Virtualchain. In Workshop on Distributed Cryptocurrencies and Consensus Ledgers, 2016.
Nelson, Jude, Dissertation: Wide-Area Software-Defined Storage, dated Jun. 2018.

* cited by examiner

*Primary Examiner* — Meng Li
(74) *Attorney, Agent, or Firm* — Knobbe Martens Olson & Bear LLP

(57) ABSTRACT

In a decentralized system based on a blockchain, a system and method automates the process for migrating data for decentralized applications stored off-chain between backend storage providers, such as cloud-based storage providers, such that a frontend client can perform migration processes without exposing encrypted data, using client-controlled keys, and without long running server-side processes.

20 Claims, 7 Drawing Sheets

US 10,637,666 B1

MIGRATING DATA FOR DECENTRALIZED APPLICATIONS BETWEEN DISPARATE BACKEND STORAGE PROVIDERS

BACKGROUND

Field

This disclosure generally relates to networks implementing a blockchain. More specifically, this disclosure relates to off-chain storage of data accessible within the context of a blockchain network.

Description of the Related Art

Blockchain is a distributed digital ledger that allows multiple parties to engage in secure, trusted transactions with one another without an intermediary. The blockchain itself can include a chain of blocks that are linked together cryptographically, with each block in the chain storing one or more transactions and the number of blocks in the chain growing over time. The blocks can be linked together using a cryptographic hash. For example, each block can include a cryptographic hash of a previous block in the chain. Because each block includes a cryptographic hash of a previous block in the chain, a transaction stored in one block cannot be altered without all subsequent blocks being altered as well. The likelihood that all subsequent blocks being altered is low given that such an alteration would require approval from a majority of the computing devices or participants participating in the blockchain.

Individual blockchain records cannot hold much data, often on the order of single kilobytes. Off-chain backend data storage linked to a blockchain can increase the amount of storage available in the context of a blockchain-based network.

SUMMARY

The systems, methods, and devices described herein each have several aspects, no single one of which is solely responsible for its desirable attributes. Without limiting the scope of this disclosure, several non-limiting features will now be discussed briefly.

Systems and/or computer systems are disclosed that comprise a computer readable storage medium having program instructions embodied thereon, and one or more processors configured to execute the program instructions to cause the one or more processors to perform operations comprising one or more aspects of the above- and/or below-described embodiments (including one or more aspects of the appended claims, which are incorporated in this written description by reference).

Computer-implemented methods are disclosed in which, by one or more processors executing program instructions, one or more aspects of the above- and/or below-described embodiments (including one or more aspects of the appended claims) are implemented and/or performed.

Computer program products comprising a computer readable storage medium are also disclosed, wherein the computer readable storage medium has program instructions embodied thereon the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

Throughout the drawings, reference numbers may be (but are not necessarily) reused to indicate corresponding elements. The drawings are provided to illustrate example embodiments described herein and are not intended to limit the scope of the disclosure.

DETAILED DESCRIPTION

The following U.S. patent applications, filed Aug. 29, 2019, are incorporated by reference in their entireties (including the written description, claims, and drawings) for all that they disclose: U.S. patent application Ser. No. 16/555,541 (entitled BACKUP OF ENCRYPTED INFORMATION STORED OFF-CHAIN IN A BLOCKCHAIN-BASED DECENTRALIZED STORAGE SYSTEM); U.S. patent application Ser. No. 16/555,677 (entitled PLATFORM AND ASSOCIATED METHOD FOR AUTHENTICATING THE IDENTITY OF A USER IN A DECENTRALIZED SYSTEM WITHOUT NEED FOR A THIRD-PARTY IDENTITY SERVICE); U.S. patent application Ser. No. 16/555,533 (entitled CLIENT-SIDE AUTHENTICATION SYSTEM AND ASSOCIATED METHOD); U.S. patent application Ser. No. 16/555,513 (entitled SYSTEM AND METHOD FOR REGISTERING INSTANTANEOUSLY CONFIRMABLE IDENTIFIER IN A BLOCKCHAIN-BASED DOMAIN NAME SYSTEM).

Blockchain Technology

Blockchains are decentralized digital ledgers that record information distributed among a network of computers. The decentralized digital ledgers ensure each computer has identical records. Blockchain technologies consist of three fundamental components: cryptographically linked data structures, networking, and consensus protocols.

Figure 1:
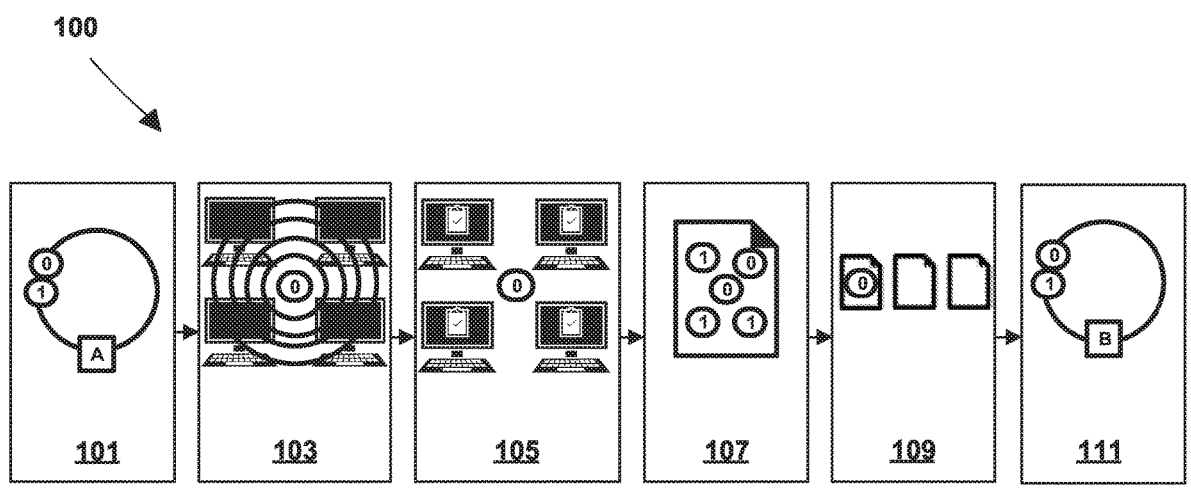
FIG. 1 provides an overview of a blockchain network.

First, a blockchain consists of a series of digital "blocks" that are securely linked together in sequential order using cryptography to create a virtual chain of data. These blocks record information such as financial transactions, agreements between parties, and ownership records, as shown in FIG. 1, which provides an overview of a blockchain network 100. In block 101 of FIG. 1, a transaction to transfer a digital coin from user A to user B is initiated by user A. In block 103, the transaction is broadcast to every node in the network. In block 105, the nodes form a consensus on whether the transaction is valid. In block 107, the nodes add valid transactions to a "block." In step 109, the block is added to the blockchain. In step 111, the transaction is complete and the digital coin transfers to user B (e.g., user B).

Second, a blockchain runs on a distributed network of computers. Computers in the network, also referred to as nodes, store copies of the blockchain, validate that the blockchain has not been tampered with, and verify when transactions can be added to a new block. Nodes share and synchronize all updates. To be clear, a node does not need to represent a distinct machine. Multiple nodes can run on the same machine (e.g., one node per core).

Finally, blockchains maintain agreement between participants using a "consensus protocol"—a set of rules that allows nodes to determine when to add new information to the blockchain. Consensus protocols are designed to make the blockchain resistant to tampering and ensure consistency in the data among all participants in the network.

In general, a blockchain is a global append-only log. Writes to the global append-only log are called transactions, and transactions are organized into blocks. Thus, each block can include or package a single transaction or multiple transactions. Writing to the global append-only log (e.g., writing to a block) requires a payment in the form of a transaction fee.

Decentralized Platform

In at least one embodiment, a blockchain network serves as the base of a stack in a decentralized software platform. This blockchain network will be referred to as the base blockchain. The base blockchain can be a public (permissionless) network, in which anyone can join the network, or a private (permissioned) network, which places restrictions on who may participate in the network and in which transactions. The base blockchain can also be a virtual blockchain. A virtual blockchain is a layer that resides on top of a public or private blockchain network. The nodes of the underlying blockchain network are not aware of the presence of virtual blockchains. New operations are defined in the virtual blockchain layer and are encoded in the metadata of valid blockchain transactions. Accordingly, the underlying blockchain nodes receive and store information about the virtual blockchain transactions, but the logic for processing the virtual blockchain transaction only exists at the virtual blockchain level.

Suitable base blockchain networks include Bitcoin, Ethereum, and the STACKS™ blockchain (Blockstack PBC, New York City, N.Y., USA). Preferably, the base blockchain enables users to register and control digital assets like usernames and register/execute smart contracts.

Such a platform can be implemented, for example, for supporting decentralized applications or "DApps." A DApp is different from a traditional world-wide-web-based or other client-server-based application. In this context of this disclosure, DApp is a broad term and includes executable applications and websites that do not require a centralized server to store user information for users of the executable application or website. An example of a DApp is a decentralized microblogging platform, akin to the TWITTER online news and social networking service (Twitter, Inc., San Francisco, Calif., USA), in which users post or interact with short messages. Unlike a centralized system, once a user publishes a message with the microblogging DApp, the message cannot be erased by anyone except the user, including by the company that created the DApp. This is because the DApp provider does not have centralized control over the user's (or any other user's) messages.

In certain embodiments, after logging in to the platform with a username, a user can use the same username to interact with multiple DApps on the platform, irrespective of which entity created or maintains the DApp. For example, after logging in with a username, a user can use the same username for buying books online from one entity's DApp ("App1") and to post on social media provided by a different entity's DApp ("App2"). The creator/administrator of the platform can be different from both the creators/administrators of App1 and App2.

Off-Chain Data Storage

Individual blockchain transactions cannot hold much data, often on the order of single-digit kilobytes or less, depending on the base blockchain. Off-chain backend data storage linked to a blockchain can increase the amount of storage available to DApps to multiple terabytes, petabytes, or greater. Aspects of an example implementation of such an off-chain storage system are described in U.S. Patent Application Publication No. 2017/0236123 to Ali et al., the disclosure of which is incorporated by reference in its entirety, including the description of the external data storage units in paragraphs 66-75 and FIG. 2.

By implementing off-chain backend data storage, a platform can be beneficially structured such that a user exiting a DApp leaves no data under the DApp's or platform's control because none was stored with the DApp or with the platform creator/administrator. Personal information and data are encrypted and remain under the control of the user.

Figure 2:
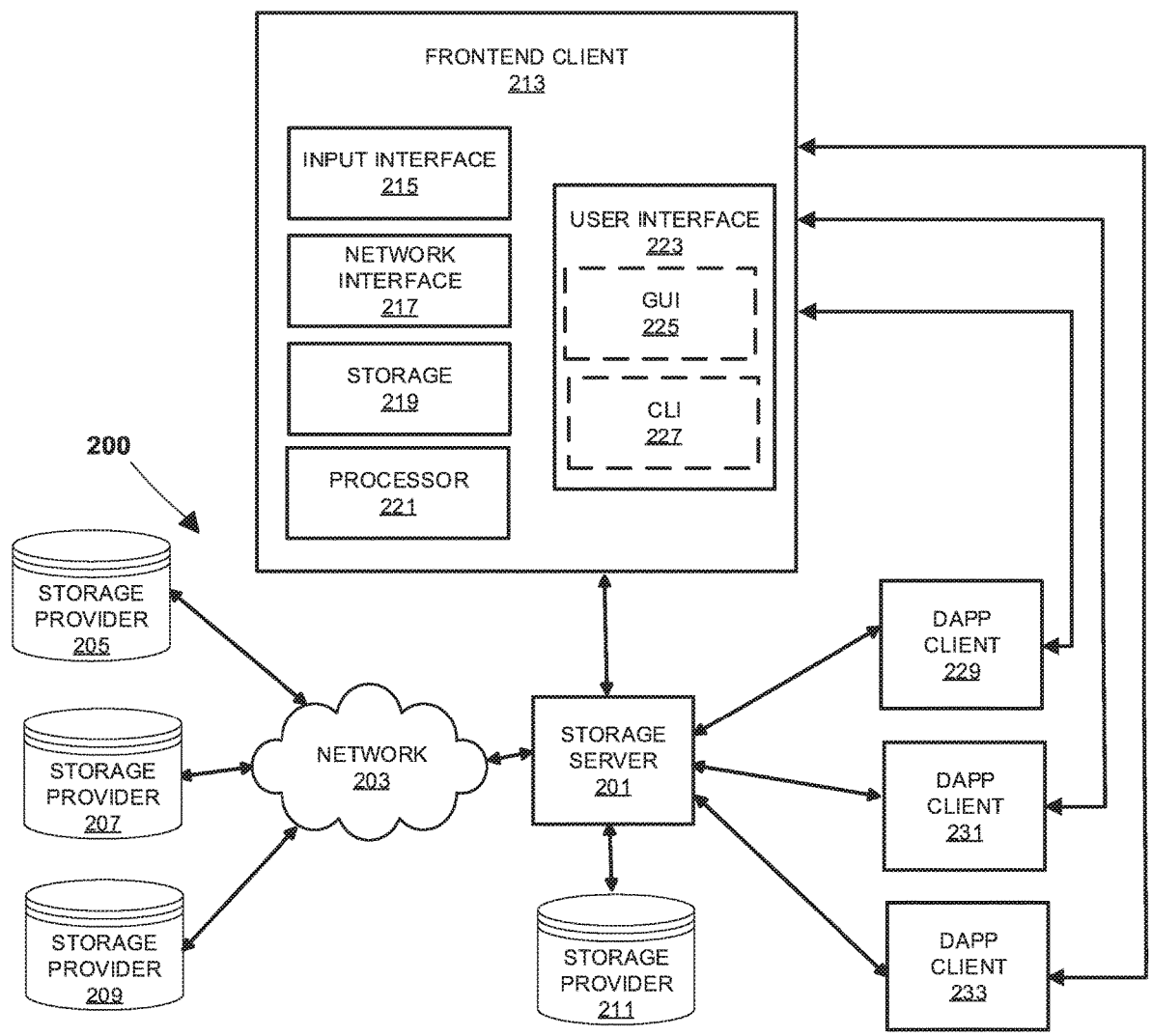
FIG. 2 is a block diagram of an illustrative operative environment in which off-chain decentralized storage is implemented in a blockchain-based network.

FIG. 2 of the present disclosure shows a block diagram of an illustrative operative environment 200 in which off-chain decentralized storage is implemented in a blockchain-based network.

The decentralized storage is embodied in arbitrary backend storage providers 205-211. A backend storage provider 205-211 can be, without limitation, a cloud storage provider, a local disk, or remote storage. Suitable backend storage providers include Amazon S3 (Amazon Web Services, Inc., Seattle, Wash., USA), Google Cloud storage and Google Drive (both by Google LLC, Mountain View, Calif., USA), Dropbox (Dropbox, Inc., San Francisco, Calif., USA), Microsoft Azure (Microsoft Corp., Redmond, Wash., USA), FreeNAS Server (iXsystems, Inc., San Jose, Calif.), FTP, network storage, and local storage. In FIG. 2, for example, storage providers 205 and 207 represent cloud storage, storage provider 209 represents network storage, and storage provider 211 represents 211. The storage server 201 communicates with each storage provider 205-211 via a distinct network connection.

In FIG. 2, the environment 200 further includes a storage server 201 that interfaces with these arbitrary backend storage providers 205-211 either directly (e.g., with storage provider 211) or via a network 203 and exposes a consistent interface to DApps servers 229-233 for storing data to and reading data from these storage providers 205-211. The storage server can be hosted by a third-party provider or by a user of the frontend client 213 discussed below. In at least one embodiment, the storage server 201 writes data as it is provided to it from DApp clients 229-233. The storage server 201 may not offer guarantees about the written data. For example, it may not ensure that the data is validly formatted, contains valid signatures, or is encrypted. These guarantees can be provided by frontend client libraries, discussed later in this disclosure.

The storage server 201 also interfaces with one or more frontend clients 213. A frontend client 213 is a computing device that can allow a user to manage storage of the user's profile and application data and find and launch DApps. A frontend client 213 includes one or more input interfaces 215, one or more network interfaces 217, a local storage 219, and a processor 221. The user interface 215 is configured to receive data, including private key data sufficient to identify a parent private key of a user. For example, the private key data can represent a 12-24 word mnemonic or the parent private key itself. The one or more network interfaces 217 are configured to couple the frontend client 213 to the storage server 201 and the DApp clients 229-233. The frontend client 213 also includes a user interface 223 capable of displaying a graphical user interface 225, a command line interface 227, or both. The local storage 219 (including a non-transitory computer readable storage medium storing program instructions) and the hardware processor 221 function together such that the hardware processor 221 executes the program instructions stored by the local storage 219, which causes the frontend client 213 to perform certain actions.

Although FIG. 2 shows one frontend client 213, it should be understood that, in practice, multiple frontend clients can interact with the storage server 201. As shown next in FIG. 3, the environment 200 of FIG. 2 is structured such that user A 301 (associated with one frontend client) and user B (associated with a different frontend client) each has access to the user's selected storage provider, without having access to each other's storage provider. Here, for example, user A 301 has access to storage provider 207 (through the storage server 201 of FIG. 2) and user B 303 has access to storage provider 205 (through the storage server 201 of FIG. 2). But user A 301 does not have access to the storage provider 205 of user B 303; and user B 303 does not have access to the storage provider 207 of user A 301.

Within a storage provider (such as storage provider 205), each DApp associated with a user writes data to and reads data from a data locker. Data locker is a broad term and includes a location on a backend storage provider, such as a directory or partition or logical or virtual storage, capable of storing data. Stated another way, a data locker is specific to a user and a DApp. Users user A 301 and user B 303 (of FIG. 3), and other users, each have access to DApp client 229 and DApp client 231 (of FIG. 2). Each user can control a distinct data locker associated with DApp client 229 and DApp client 231 on the backend storage provider of the user's choosing. In the example of FIG. 4, user B 303 is associated with DApp sever 229 and DApp client 231, and each of those DApps is associated with a distinct data locker on user B's selected backend storage provider 205. DApp client 229 can access data locker 403 and DApp client 231 can access data locker 401; but DApp client 229 cannot access data locker 401 and DApp client 231 cannot access data locker 403. In this way, a data locker is only accessible for reads and writes by its associated DApp, and another DApp cannot access the data in an unassociated data locker, even when those DApps are associated with the same username.

Figure 3:
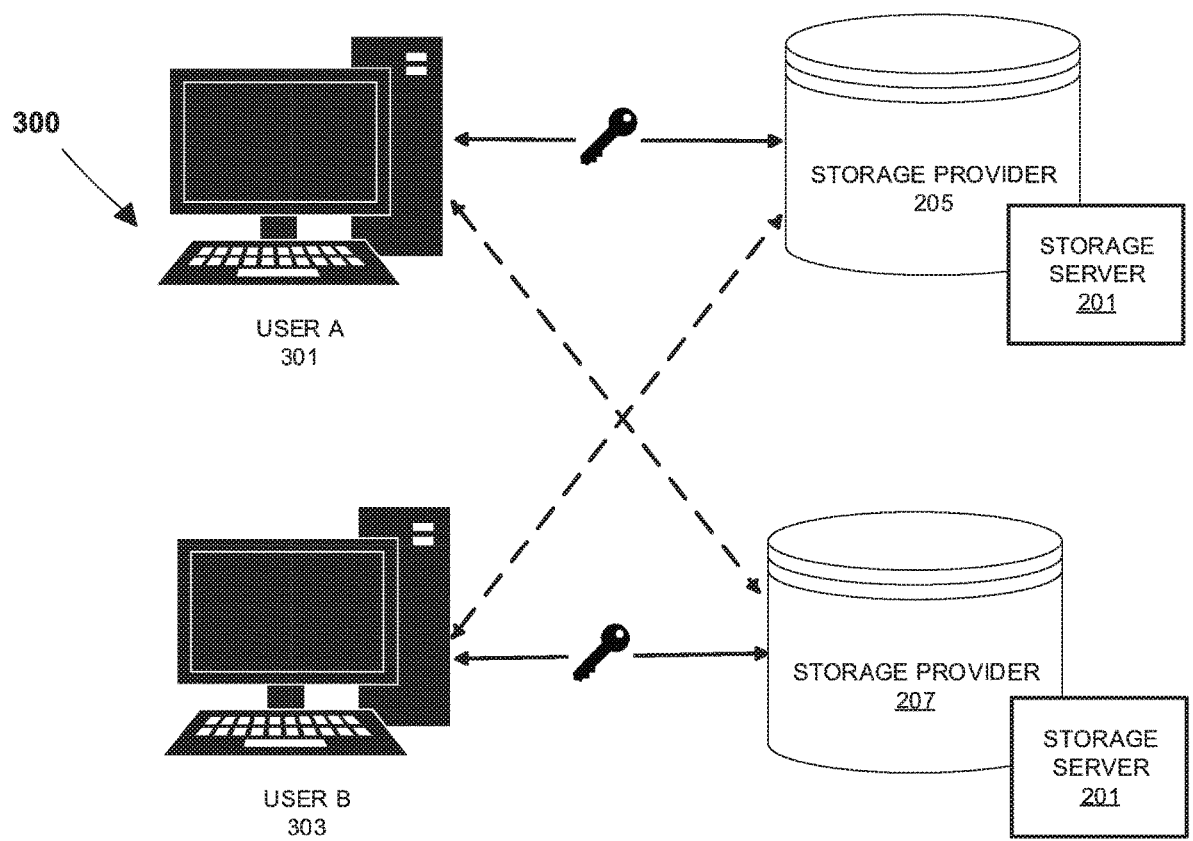
FIG. 3 is a block diagram showing an illustrative relationship between users and off-chain storage providers.
Figure 4:
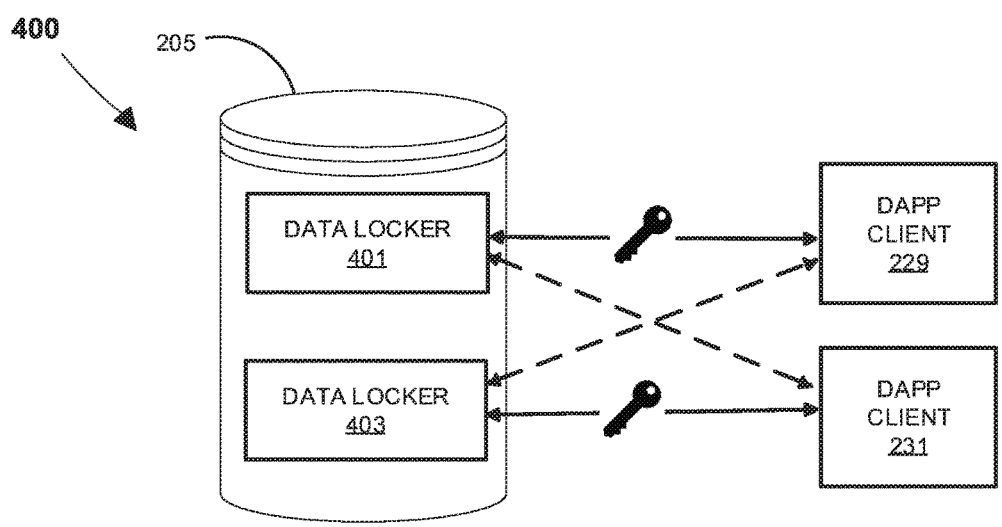
FIG. 4 is a block diagram showing an illustrative relationship between decentralized applications and data lockers on an off-chain storage provider.

To summarize FIGS. 2-4, the storage server 201 (FIG. 2) is executed by a third-party provider or by user A 301 (FIG. 2). The storage server 201 is programmed to store data to a backend storage provider (any of storage providers 205-211). User A 301 logs into the storage server 201 and then, with this username, can access DApps via DApp clients 229-233. When user A 301 uses the username to access DApp client 229, all of the reads and writes from DApp client 229 are directed to a data locker that is logically storage server 201/DApp 229 (the DApp provided by DApp client 229). This configuration applies to other users with access to the storage server 201. Preferably, as shown in FIG. 4, writes and reads from storage server 201/DApp 229 are invisible to DApp 231 and DApp 233 (the DApps provided by DApp clients 221 and 233), and DApp 231 and DApp 233 are not able to interfere with data from DApp 229.

Data Lockers

To prevent DApps from interfering with data lockers with which they are not associated, the DApp-specific data stored in a data locker can be encrypted based on a DApp-specific private key. The DApp-specific private key can be based in part on the DApp's unique name or location (such as a URL or a network address) or other identifier. When the data in storage server 201/DApp 229 is encrypted based on the private key specific to DApp 229, then DApp 231 and DApp 233 cannot interfere with the data in storage server 201/DApp 229, because DApp 231 and DApp 233 have no access to the DApp 229-specific private key. More specifically, the storage server executes computer-implemented instructions applying cryptographic authentication to enforce the requirement that an unauthorized DApp cannot interfere with a data locker. The cryptographic authentication can require 1) knowing how to derive the DApp-specific private key; and 2) in the case of writes, also knowing a private key needed to sign an authentication token.

So long as the specified backend storage provider location does not change, then access to the data by a user's associated DApps will function normally because the DApp-specific private key does not change. With the foregoing environment, the user need only log in once with the user's username, and the user will remain logged into all DApps that the user has chosen. A chosen DApp can complete writes and reads, because the DApp has all information regarding all necessary keys.

Data Migration Problem

Again, a preferred embodiment of the platform allows data to be encrypted and remain under the control of the user. Consistent with the goal of user-centric data control, a user may wish to change backend storage providers and migrate the user's data lockers and the data associated with the data lockers from one backend storage provider to a new backend storage provider. Certain embodiments include the inventive realization that such data migration in a decentralized, encrypted system presents a technical problem. The storage server 201 (of FIG. 2) abstracts many possible storage backends and allows DApps to interact with those heterogenous storage backends. In a system with heterogenous backends, however, it is not trivial to port data from one to another. For all possible pairings of backends (Amazon S3 to Google Cloud, Amazon S3 to local storage, Amazon S3 to FTP, Google Cloud to Amazon S3, Google Cloud to local storage, Google Cloud to FTP, and so forth), individually writing porting code that moves data from one backend to another encompasses $N^2$ possible pairings. As N increases, it may become difficult or impossible to provide comprehensive porting code that supports data migration between storage backends adequately.

This disclosure provides a technical solution to the technical problem and acknowledges the inventive realization that, as shown in FIG. 2, when the storage server 201 presents a consistent interface to the heterogenous storage backends, that interface can be leveraged by the frontend client 213 for data migration. In this regard, the frontend client 213 derives the DApp-specific private keys to allow for data migration through authorized requests sent to the storage server 201 for copying the data from the data lockers on the old backend storage provider to data lockers on the new backend storage provider, and allowing for writing to and reading from the data lockers on the new backend storage provider going forward. A DApp-specific private key is used to create the credentials that give a DApp access to its associated data locker via the storage server. It is also used in the end-to-end encryption of files stored for that DApp in the user's backend storage provider. And it serves as a cryptographic secret that the DApp can use to perform other cryptographic functions. The DApp-specific private key is deterministic, meaning that the same DApp-specific private key can be derived each time for a given user and DApp identifier.

As discussed below, embodiments of this disclosure automate the process for migrating data for decentralized applications stored off-chain between backend storage providers, such that a frontend client can perform migration processes without exposing encrypted data, using client-controlled keys, and without long running server-side processes. Additional embodiments of this disclosure describe a frontend client system and associated frontend method that perform processes for backing up encrypted data in backend storage, such that a frontend client can perform the backup without exposing the encrypted data, using the client-controlled keys, and without long running server-side processes.

DApp-Specific Key Derivation

Each user of the storage server 201 has a unique user private key based on, for example, an elliptic curve point. In at least one embodiment, the user private key is Base58 encoded. Preferably, a user private key has the property that there is no way to know or derive the user private key without already knowing it. The user private key can be used as an input to a function that derives a new DApp-specific private using the user private key and an integer or other value based on an identifier unique to the DApp as inputs. Preferably, the derive function is a one-way function that hashes data such that the DApp-specific private key has the property that there is no way to know the DApp-specific private key without also knowing the integer or other value.

In a preferred embodiment, the DApp-specific private key is generated from the user private key using the DApp's domain name as input. Again, it is deterministic in that, for a given user (such as a system user ID) and DApp domain name, the same DApp-specific private key is generated each time.

Figure 5:
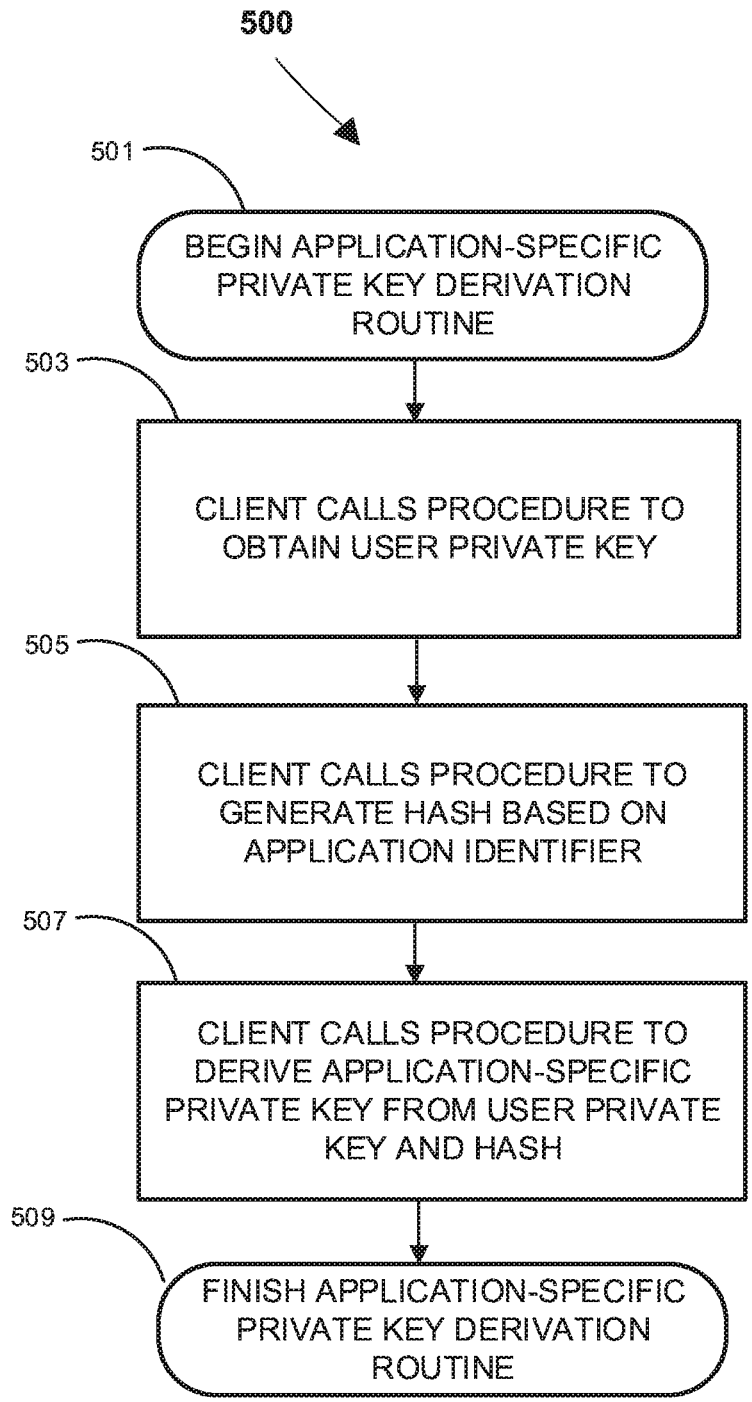
FIG. 5 provides a routine for returning a decentralized application-specific private key by a client computer, distinct from the off-chain storage provider, in a decentralized network.

FIG. 5 illustrates a process 500 for deriving the DApp-specific private key based on the user private key and DApp identifier unique to the DApp, such as a URL, domain, or other address associated with the DApp. The process begins in element 501. In element 503, the frontend client calls a procedure to obtain the user private key. In element 505, the client calls a procedure to generate a hash based at least on the unique DApp identifier. The hash can also be based on a salt (data that is used as an additional input). The salt can be secret or non-secret, depending on the implementation. The salt can be based, for example, on the user's username and/or address used to login to the DApp or other secret or non-secret information. The DApp identifier and the salt, if included, are input to a hash function. An example hash function can include the SHA-256 algorithm. The output of hash (hereinafter, the "hash") can be, for example, hexadecimal value. In element 507, the client calls a procedure to derive DApp-specific private key from the user private key and the hash.

Figures 6, 7:
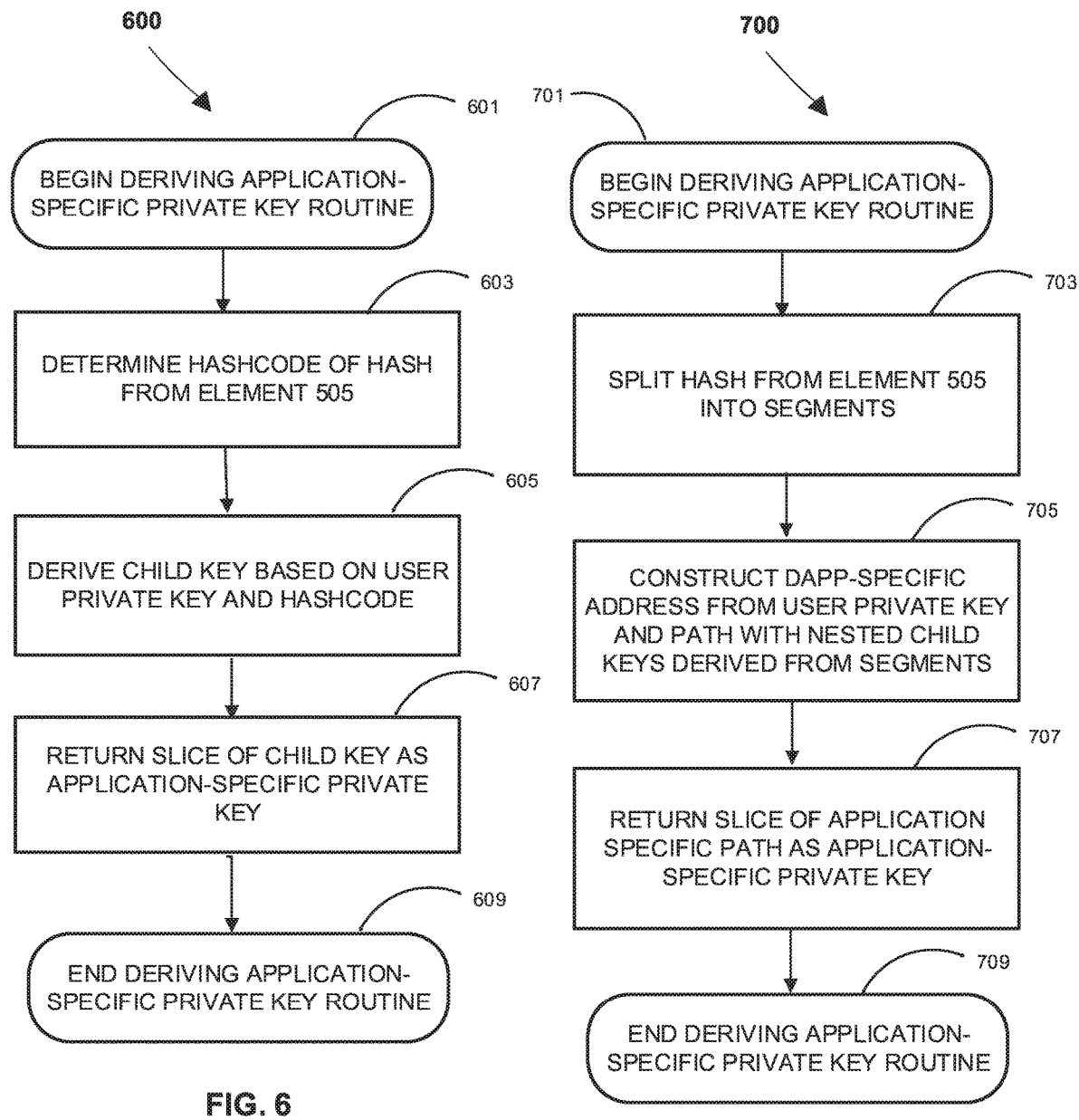
FIG. 6 provides one alternative of a routine for deriving the decentralized application-specific private key, FIG. 7 provides another alternative of a routine for deriving the decentralized application-specific private key.

FIG. 6 illustrates a process 600 for deriving the DApp-specific private key based on the user private key and the DApp identifier unique to the DApp (see element 507 of FIG. 5). The process begins in element 601. As shown in element 601, the hash is transformed using a hashcode function that processes the leading bits of the hash. The hashcode function can, for example, return a 31-bit slice of the transformed hash as the hashcode output. Example 1 below demonstrates an example hashcode algorithm in Javascript code:

```
function hashCode(string: string) {
    let hash=0
    if (string.length===0) return hash
    for (let i=0; i<string.length; i++) {const
        character=string.charCodeAt(i)    hash=(hash<<5)-
        hash+character hash &=hash
    }
    return hash & 0x7fffffff
}
```

Example 1

Turning next to element 605, a DApp-specific child key, such as a hardened child key, is derived based on the Base58 representation of the user private key and the hashcode output. In element 607, the DApp-specific private key is returned as, for example, the first 64 digits of the child key (which in turn is based on the DApp identifier unique to the DApp). The process ends in element 609.

FIG. 7 illustrates another process 700 for deriving the DApp-specific private key based on the user private key and the DApp identifier unique to the DApp. The approach in FIG. 7 advantageously leverages all bits of entropy in the hash discussed above and derives a path based on all bytes from a hash. It should be understood, however, that this disclosure does not disparage either the approach of FIG. 6 or FIG. 7 and both are contemplated within the scope of this disclosure.

The process begins in element 701. Turning next to element 703, the hash is split into segments. For example, the hash can be split into 11 three-byte (that is, six hexadecimal digits) segments, and each segment is assigned to an array, such as a string array.

In element 705, a DApp-specific address is constructed from the Base58 representation of the user private key, and a lengthened path (that is longer than the path derived in FIG. 6) comprising 11 nested DApp-specific child keys derived from the 11 three-byte segments of the hash is determined. Again, the nested child keys can be hardened child keys.

In element 707, the DApp-specific private key is returned as a slice of the DApp-specific path, for example, the first 64 digits of the path derived from the user private key and the three-byte chunks of the hash, which in turn is based on the DApp identifier unique to the DApp. The process ends in element 709.

Data Migration and Backup

To allow for data migration and backup, profile data is stored on the storage server or the backend storage accessed via the storage server in a file format such as a json format. When a user logs into a DApp for the first time, information about the DApp is added to the user's profile data. To allow for data migration, the information added to the user's profile data includes a public part of the DApp-specific private key and the DApp identifier. The public part of the DApp-specific private key can be, for example, the hash calculated in element 505 of FIG. 5 (or an identifier based on the hash). The DApp-specific private key cannot be derived without the user private key, even if the hash (the public part of the DApp-specific private key) is known; but the DApp-specific private key cannot be derived unless the hash is known. Certain embodiments include the inventive realization that storing information about the hash in a known location, such as the user's profile data, ensures that the DApp-specific private key can be rederived when the user chooses to migrate to a different backend storage provider, without requiring the DApp-specific private key to be stored.

The foregoing process repeats each time the user initially logs into a new DApp. Therefore, the user's profile data will include all DApps associated with the user, the information unique to the DApp used to derive the DApp-specific private key, and the public part of the DApp-specific private key for each DApp.

Figure 8:
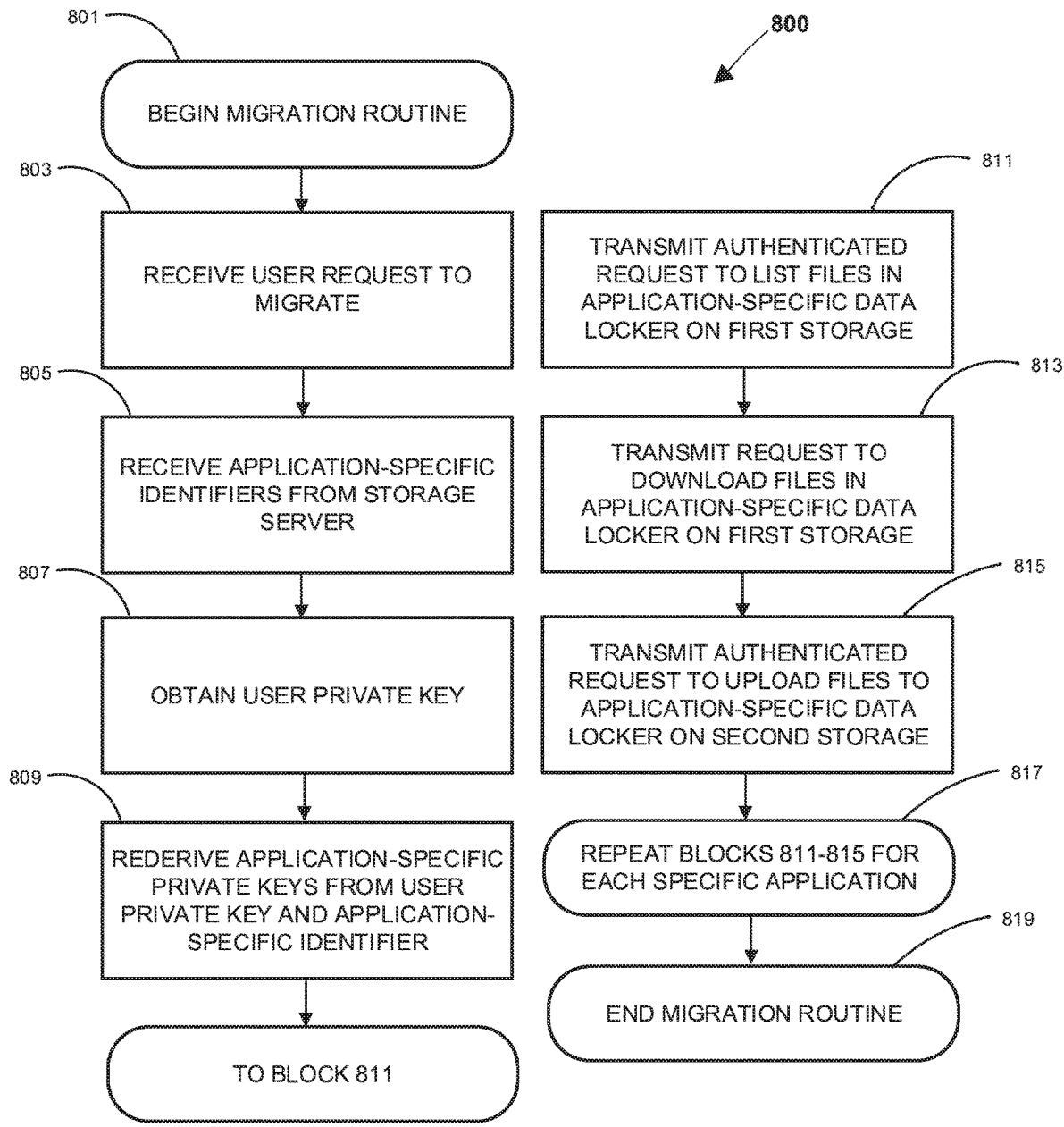
FIG. 8 provides a routine for migrating data between off-chain storage providers.

An example migration process is illustrated in FIG. 8. The process begins in element 801. In element 803, the frontend client receives a user request to migrate data to a different storage provider. In element 905, the frontend interface requests from the storage server the entries of each DApp identifier and the corresponding public part of the DApp-specific private key from the user's profile data, and receives the requested data. Turning next to element 807, the frontend client receives the user's private key (see element 503 of FIG. 5). In element 809, the DApp-specific private key of each of the user's DApps is rederived using the same derivation process implemented in FIG. 6 or 7. The DApp-specific private key of each of the user's DApps is now known and can be used to decrypt each application-specific data locker on the user's old backend storage.

Knowing the DApp-specific private key permits the storage server to obtain the listing of files in that DApp's data locker on the old backend storage provider, download the files in the data locker, and upload those files to a data locker at the new backend storage provider, because the storage server exposes functions to list files in the data locker, download files from the data locker, and upload files. Accordingly, as shown in element 811, the frontend client transmits an authenticated request to list files in a DApp-specific data locker on the first storage provider. That command provides the listing of all files in the DApp-specific data locker. The frontend client then can issue an instruction to download the listed files in the DApp-specific data locker, as shown in element 813, The frontend client then can use the DApp-specific private key to upload the downloaded files to a corresponding DApp-specific data locker at the new storage provider, as shown in element 815. As shown in element 817, this process repeats for each DApp-specific identifier retrieved from the user's profile. The migration process ends in element 819.

Figure 9:
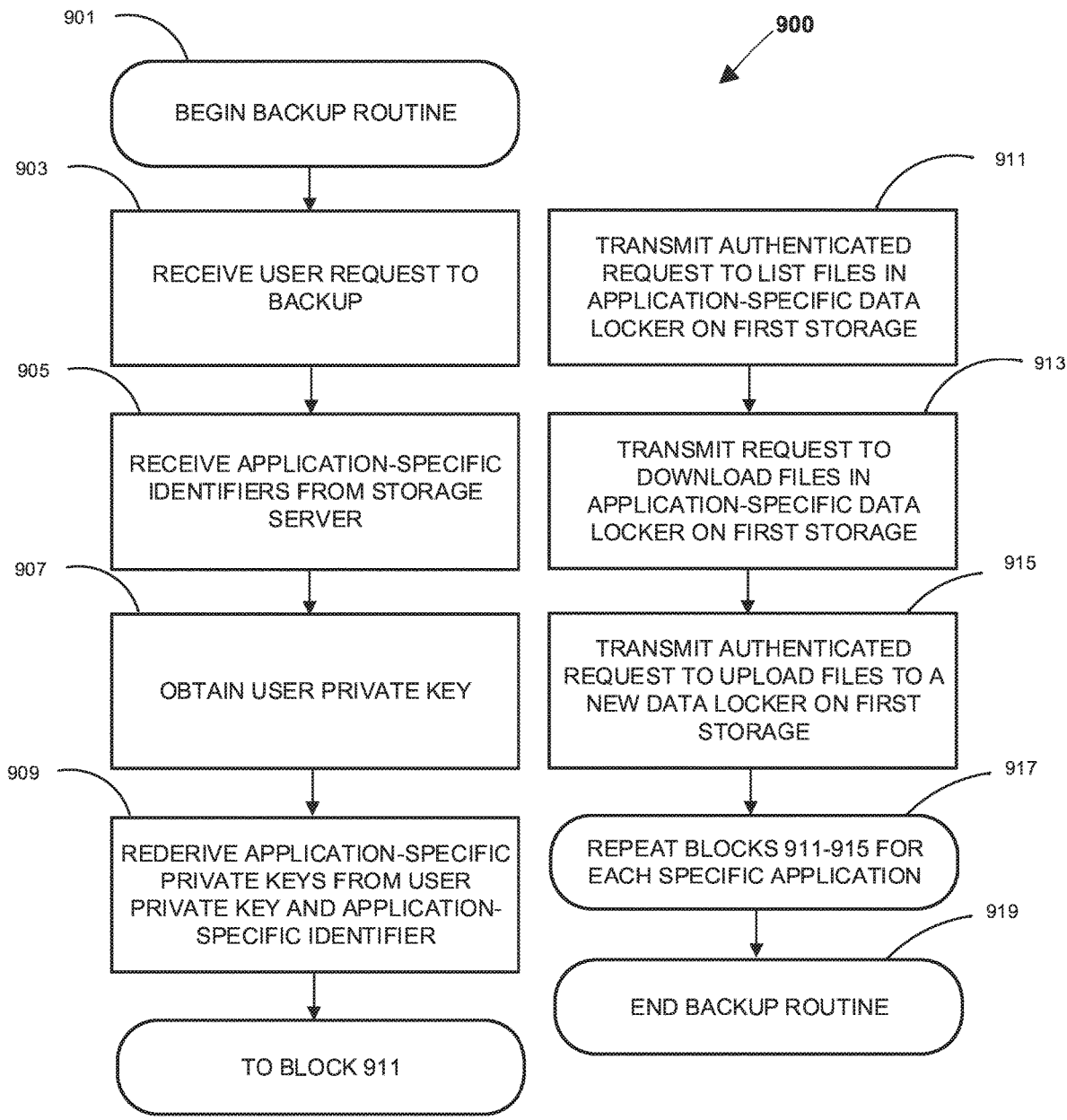
FIG. 9 provides a routine for backing up data stored in an off-chain storage provider.

FIG. 9 shows a process 900 for backing up data that is similar to the process shown in FIG. 8. In the process of FIG. 9, the elements 901-917 are similar to elements 801-817 of FIG. 8, except that data is being backed up to a different data locker on the same storage provider.

To summarize, in the environment of FIG. 2, each DApp-specific data locker is prevented from accessing any other DApp's data locker. Conceptually, each data locker has a different DApp-specific private key enabling access to its associated data locker. But the way the DApp-specific private keys are derived according to this disclosure means that, for all DApp-specific private keys, there exists one master user private key that can open all of the data lockers if additional information about the DApp is known. The foregoing system configuration provides a method of rederiving all DApp-specific private keys so the storage server can open all the data lockers, move files out of them, and store them in a new set of data lockers.

System Structure

The system structure can be configured with backend storage providers interacting with frontend applications and storage server providing an interface between the backend storage providers and the frontend applications. As discussed above, these backend storage providers can be any cloud storage, local storage, or network storage provider. A preferred, but non-limiting, embodiment of the storage server is the Gala™ decentralized storage system (Blockstack PBC, New York, N.Y., USA). The storage server does not have to be in the same physical or logical location as the backend storage provider(s), but it could be in certain embodiments. The storage server could be running locally. Regarding the frontend client(s), suitable frontend applications include command line interfaces and decentralized web browsers, such as Blockstack CLI and Blockstack Browser (Blockstack PBC, New York, N.Y., USA).

Functions for received and deriving cryptographic keys can be executed at the frontend. Therefore, the frontend client is responsible for receiving the user's private key and deriving the DApp-specific private keys. With this configuration, only the user's client application is exposed to private keys. The frontend applications also can perform the iterative steps for deriving each DApp-specific private key. The storage server exposes the interface for list-files-in-bucket, download-file, and upload-file when the frontend unlocks the corresponding data locker. The appropriate backend storage providers respond to these interfaces (list-files-in-bucket, download-file, upload-file).

Again, data is stored in whichever backend storage provider the storage server is configured to store them in.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. In a blockchain-based network, a client computing device configured to execute a plurality of decentralized applications, the client computing device comprising:
one or more input interfaces configured to receive data, including private key data sufficient to identify a parent private key of a user;
a network interface configured to couple the client computing device to a storage server, the storage server being configured to store a user profile in a file format and further configured to communicate with a first storage provider and a second storage provider via distinct network connections,
wherein the user profile includes therein a plurality of identifiers, each decentralized application of the plurality of decentralized applications having an application-specific identifier from the plurality of identifiers, and
application data for the plurality of decentralized applications are stored outside of a blockchain of the blockchain-based network in a plurality of data lockers on the first storage provider, each decentralized application having an application-specific data locker on the first storage provider, wherein the application data in the application-specific data locker are encrypted based at least in part on an application-specific private key derived from the parent private key and a hash based on the application-specific identifier;
a hardware processor; and
a non-transitory computer readable storage medium storing program instructions for execution by the hardware processor in order to cause the client computing device to:
receive, from at least one of the one or more input interfaces, change data indicating a user request to migrate the plurality of data lockers from the first storage provider to the second storage provider;

in response to the change data, request access to the user profile from the storage server and receive the application-specific identifiers therefrom;

for each received application-specific identifier,
rederive the application-specific private key based on the parent private key and the hash based on the application-specific identifier, and
transmit one or more authenticated requests to the storage server to download the application data from the first storage provider to the storage server, and to upload the application data to an application-specific data locker on the second storage provider using the rederived application-specific private key, such that, once initiated by the one or more authenticated requests, data migration from the first storage provider to the second storage provider proceeds without the need for manually performing the data migration.

2. The client computing device of claim 1, wherein the client computing device comprises a web browser client, and the web browser client is configured to transmit the change data to the at least one of the one or more input interfaces.

3. The client computing device of claim 1, wherein the client computing device comprises a command line interface client, and the command line interface client is configured to transmit the change data to the at least one of the one or more input interfaces.

4. The client computing device of claim 1, wherein the one or more authenticated requests further comprises an authenticated request to list application data in the application-specific data locker on the first storage provider.

5. The client computing device of claim 1, wherein the hash based on the application-specific identifier is related to a cryptographic hash of a salt and the application-specific identifier identifying the decentralized application.

6. The client computing device of claim 1, wherein the user profile further includes the hash based on the application-specific identifier, paired with the application-specific identifier.

7. The client computing device of claim 6, wherein the hash based on the application-specific identifier is further received from the storage server in response to the change data.

8. The client computing device of claim 1, wherein the application-specific private key comprises at least a portion of a hardened child key derived from the parent private key and the hash based on the application-specific identifier.

9. The client computing device of claim 1, wherein the program instructions for execution by the hardware processor are configured to cause the client computing device to rederive the application-specific private key based on a hashcode generated from the hash based on the application-specific identifier.

10. The client computing device of claim 1, wherein the program instructions for execution by the hardware processor are configured to cause the client computing device to rederive the application-specific private key based on a plurality of child keys derived from segments of the hash based on the application-specific identifier.

11. A computer-implemented method comprising:
under the control of a client computing device in a blockchain-based network,
receiving, from at least one of one or more input interfaces, change data indicating a user request to migrate, from a first storage provider to a second storage provider at a distinct network location from the first storage provider, application data for a plurality of decentralized applications stored in a plurality of data lockers on the first storage provider outside of a blockchain of the blockchain-based network,
wherein each decentralized application has an application-specific data locker of the plurality of data lockers on the first storage provider, and
the application data in the application-specific data locker are encrypted based at least in part on an application-specific private key derived from a parent private key and a hash based on an application-specific identifier;
in response to the change data, requesting access to a user profile from a storage server and receiving identifiers therefrom, each decentralized application of the plurality of decentralized applications having a an application-specific identifier from the identifiers;
receiving, from one or more input interfaces, private key data sufficient to identify the parent private key;
for each received application-specific identifier,
rederiving the application-specific private key based on the parent private key and the hash based on the application-specific identifier, and
transmitting one or more authenticated requests to the storage server to download the application data from the first storage provider to the storage server, and to upload the application data to an application-specific data locker on the second storage provider using the rederived application-specific private key.

12. The method of claim 11, wherein the application-specific private key comprises at least a portion of a hardened child key derived from the parent private key and the hash based on the application-specific identifier.

13. The method of claim 11, wherein the rederiving the application-specific private key is based on a hashcode generated from the hash based on the application-specific identifier.

14. The method of claim 11, wherein the rederiving the application-specific private key is based on a plurality of child keys derived from segments of the hash based on the application-specific identifier.

15. Non-transitory, computer-readable storage media comprising computer-executable instructions for migrating, from a first storage provider to a second storage provider that is distinct from the first storage provider, application data for a plurality of decentralized applications stored in an encrypted form outside of a blockchain of a blockchain-based network, wherein the computer-executable instructions, when executed by a computer system, cause the computer system to:
under the control of a client computing device configured to execute a web browser client or a command line interface client in the blockchain-based network,
receive change data indicating a user request to migrate the application data,
in response to the change data, request access to a user profile from a storage server and receiving identifiers therefrom, each decentralized application of the plurality of decentralized applications having an application-specific identifier from the identifiers;
receive private key data sufficient to identify a parent private key of the user;
for each received application-specific identifier,
derive the application-specific private key based on the parent private key and a hash based on the application-specific identifier, and transmit one or more authenticated requests to the storage server to download the application data from the first storage provider to the storage server, and to upload the application data to the second storage provider using credentials created from the derived application-specific private key such that the application data is stored in the second storage provider in the encrypted form without the server accessing the parent private key or any application-specific private key.

16. The storage media of claim 15, wherein the one or more authenticated requests further comprise authenticated requests to list the application data and download the application data on the first storage provider to the storage server.

17. The storage media of claim 15, wherein the application-specific private key comprises at least a portion of a hardened child key derived from the parent private key and the hash based on the application-specific identifier.

18. The storage media of claim 15, wherein the deriving the application-specific private key is based on a hashcode generated from the hash based on the application-specific identifier.

19. The storage media of claim 15, wherein the deriving the application-specific private key is based on a plurality of child keys derived from segments of the hash based on the application-specific identifier.

20. The storage media of claim 19, wherein the plurality of child keys are hardened child keys.

* * * * *